Nov. 4, 1924.
J. S. REYNOLDS
CULTIVATOR
Filed Oct. 28, 1920
1,514,461
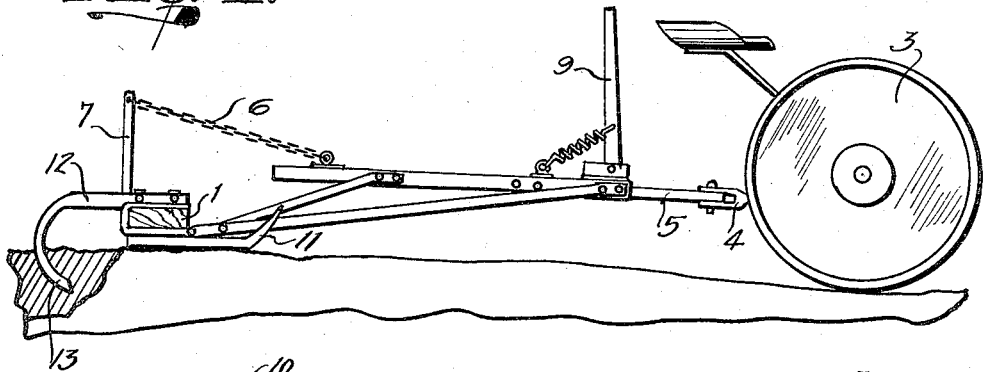
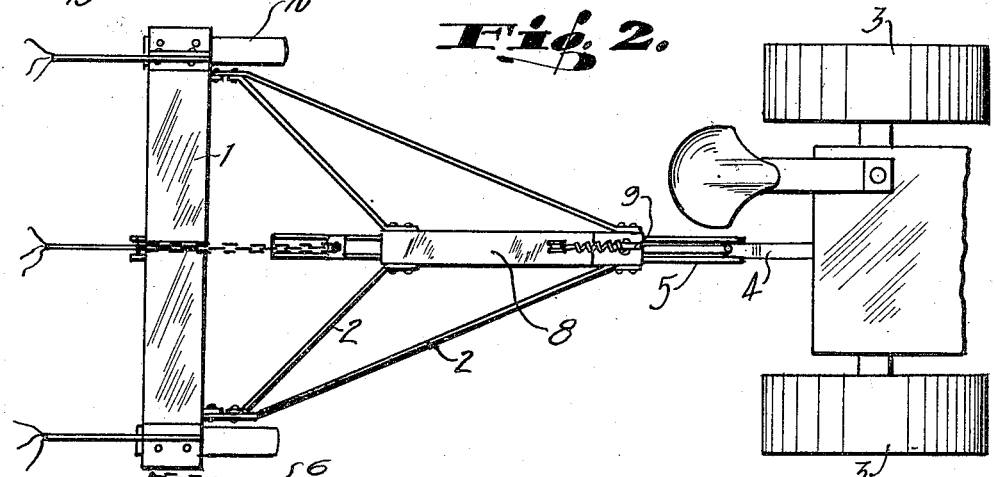
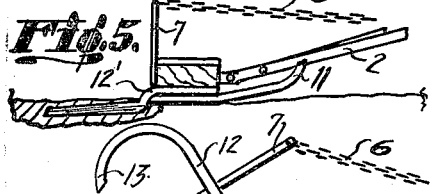
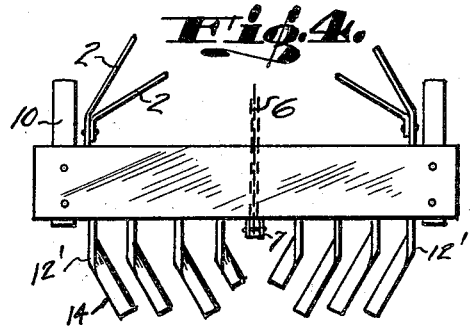
INVENTOR
Joseph S. Reynolds.
by Hazard & Miller
ATT'YS.

Patented Nov. 4, 1924.

1,514,461

UNITED STATES PATENT OFFICE.

JOSEPH S. REYNOLDS, OF CARPINTERIA, CALIFORNIA.

CULTIVATOR.

Application filed October 28, 1920. Serial No. 420,234.

*To all whom it may concern:*

Be it known that I, JOSEPH S. REYNOLDS, a citizen of the United States, residing at Carpinteria, in the county of Santa Barbara and State of California, have invented new and useful Improvements in Cultivators, of which the following is a specification.

This invention relates to cultivators and other earth working machinery having means for moving the earth engaging elements into operative and inoperative position, such as shown and described in my co-pending application Serial Number 352,902, filed January 20, 1920.

It is the particular object of the present invention to provide a construction which, when the earth working elements are moved into inoperative position, will form a novel support for the elements while in such position. The support for the earth working elements in their inoperative position consists of shoes or skids adapted to engage the ground for permitting free movement of the machine along the ground.

The invention will be readily understood from the following description of the accompanying drawings, in which:

Figure 1 is a side elevation of a machine constructed in accordance with the invention.

Fig. 2 is a plan view of the same.

Fig. 3 is a vertical section through the machine showing the earth working elements in their inoperative position.

Fig. 4 is a fragmentary plan view showing a modified form of the invention.

Fig. 5 is a vertical section through the same with the earth working elements in operative position.

The machine forming the subject matter of the present invention may include a frame connected to a tractor by an operating connection arranged to provide for the movement of the earth engaging elements of the machine from operative to inoperative position, all the parts as thus set forth being substantially as shown in my above mentioned co-pending application.

The frame of the machine includes a rear cross bar 1 to which braces 2 are pivotally connected. The tractor is shown at 3 and a draw bar connects the draft member 4 of the tractor to the machine, this draw bar consisting of a link 5 pivoted at its rear end to a flexible connection 6 which is in turn secured to a rod 7 extending inwardly from the rear of cross frame 1.

The frame 8 is slidably mounted upon the link 5, and the braces 2 are connected to this frame. This slidable frame is locked with relation to link 5 by a lever member 9 pivoted on the sliding member 8 and arranged to engage or disengage the link 5 through swinging movement of the lever, as clearly set forth in my aforementioned co-pending application.

When the cross frame 1 is in normal working position it is supported upon members 10 shown as shoes, although it will be obvious that skids of various kinds, such as wheels, might be employed. These shoes are arranged at the respective ends of the cross frame and extending forwardly from the same with the front ends of said shoes, preferably, upturned as shown at 11. The earth engaging elements extend rearwardly from cross frame 1 and may be made of various forms.

In the form of the invention illustrated in Figs. 2 and 3, the earth engaging elements are shown as cultivators comprising shanks 12 suitably secured to and extending rearwardly from the upper surface of cross bar 1. The ends of these shanks are downwardly and then reversely curved to form cultivator shoes 13 adapted to engage the ground when the cross bar 1 is in its normal position, as illustrated in Fig. 1.

In the form of the invention illustrated in Figs. 4 and 5, the earth engaging elements are shown as blades which may comprise shanks 12', preferably, secured to the under side of cross bar 1 and extending rearwardly therefrom at an angle to the direction of draft of the implement. The rearward extensions of the shanks are inclined to the vertical and are provided with cutting edges 14.

In operation the cross bar of the machine is so positioned that the shoes 10 rest upon the surface of the earth and the earth engaging elements are disposed in operative position. When it is desired to remove the earth engaging elements from the earth, lever 9 is actuated so that the draft of the implement will draw upon flexible connection 6, as clearly set forth in my previous application, and as a result cross bar 1 will be tilted to the position shown in Fig. 3 wherein the curved ends 11 of shoes 10 engage the earth and the earth working elements are lifted to inoperative position. During the continued forward movement of the machine, cross bar 1 and the earth engaging elements will be supported by the curved ends of the shoes and the implement may thus be readily drawn along the ground until the earth engaging elements are again lowered to operative position through actuation of lever 9.

Various changes may be made without departing from the spirit of the invention as claimed.

What is claimed is:

1. In a cultivator, a cross bar rectangular in cross section, shoes connected to the bottom of the cross bar and extending forwardly and upwardly, draft rigging connected to the cross bar, earth working elements connected to the cross bar and extending backwardly and downwardly, and means for tilting the cross bar to run upon the forward ends of the shoes and raise the earth working elements out of the ground.

2. In a cultivator, a cross frame of angular cross section, substantially J-shaped earth working elements secured to the upper side of the cross frame and extending rearwardly and downwardly therefrom, skid shoes of substantially L-shaped formation secured to the lower side of the cross frame and extending forwardly and upwardly, means for sustaining the cross frame for tilting movement, and means for tilting the cross frame in the manner and for the purpose described.

In testimony whereof I have signed my name to this specification.

J. S. REYNOLDS.